United States Patent [19]

Matossian et al.

[11] Patent Number: 5,446,962
[45] Date of Patent: Sep. 5, 1995

[54] PROCESS OF MANUFACTURING ONE-PIECE FORGED WHEELS

[75] Inventors: Hovhannes A. Matossian, Montebello; George A. Matson, Carnelian Bay, both of Calif.

[73] Assignee: Norris Industries, Inc., Los Angeles, Calif.

[21] Appl. No.: 971,378

[22] Filed: Nov. 4, 1992

[51] Int. Cl.⁶ .............................................. B21K 1/32
[52] U.S. Cl. .................................. 29/894.324; 72/356
[58] Field of Search .................... 29/894.324; 72/264, 72/355.4, 356; 301/63.1

[56] References Cited

U.S. PATENT DOCUMENTS 3,610,015 10/1971 Bollmann et al. .................... 72/264
4,290,295 9/1981 Kanamaru et al. ................... 72/356

FOREIGN PATENT DOCUMENTS 56-134037 10/1981 Japan .................... 72/355.4
62-279047 12/1987 Japan .................. 29/894.324
3210933 9/1991 Japan .................... 72/355.4
4-41038 2/1992 Japan .................... 72/355.4
24682 8/1912 United Kingdom ................ 72/356

OTHER PUBLICATIONS

Kapadia, M. A. and Elfert, R. T. "Evolution of the New Ford Aerostar Impact Extruded Aluminum Wheel" SAE Technical Paper Series 841694, Truck and Bus Meeting & Exposition, Dearborn, Mich., Dec. 3-6, 1984.

Primary Examiner—P. W. Echols
Attorney, Agent, or Firm—Edgar A. Zarins; Malcolm L. Sutherland

[57] ABSTRACT

A one-piece forged vehicle wheel manufactured from a single piece of metal material thereby forming a strong, lightweight wheel. The wheel is manufactured as a result of extrusion, forging and machining a metal blank to provide the desired contours and configuration. The integral nature of the rim and hub eliminates the need to weld components, improving integrity while reducing manufacturing costs.

13 Claims, 4 Drawing Sheets

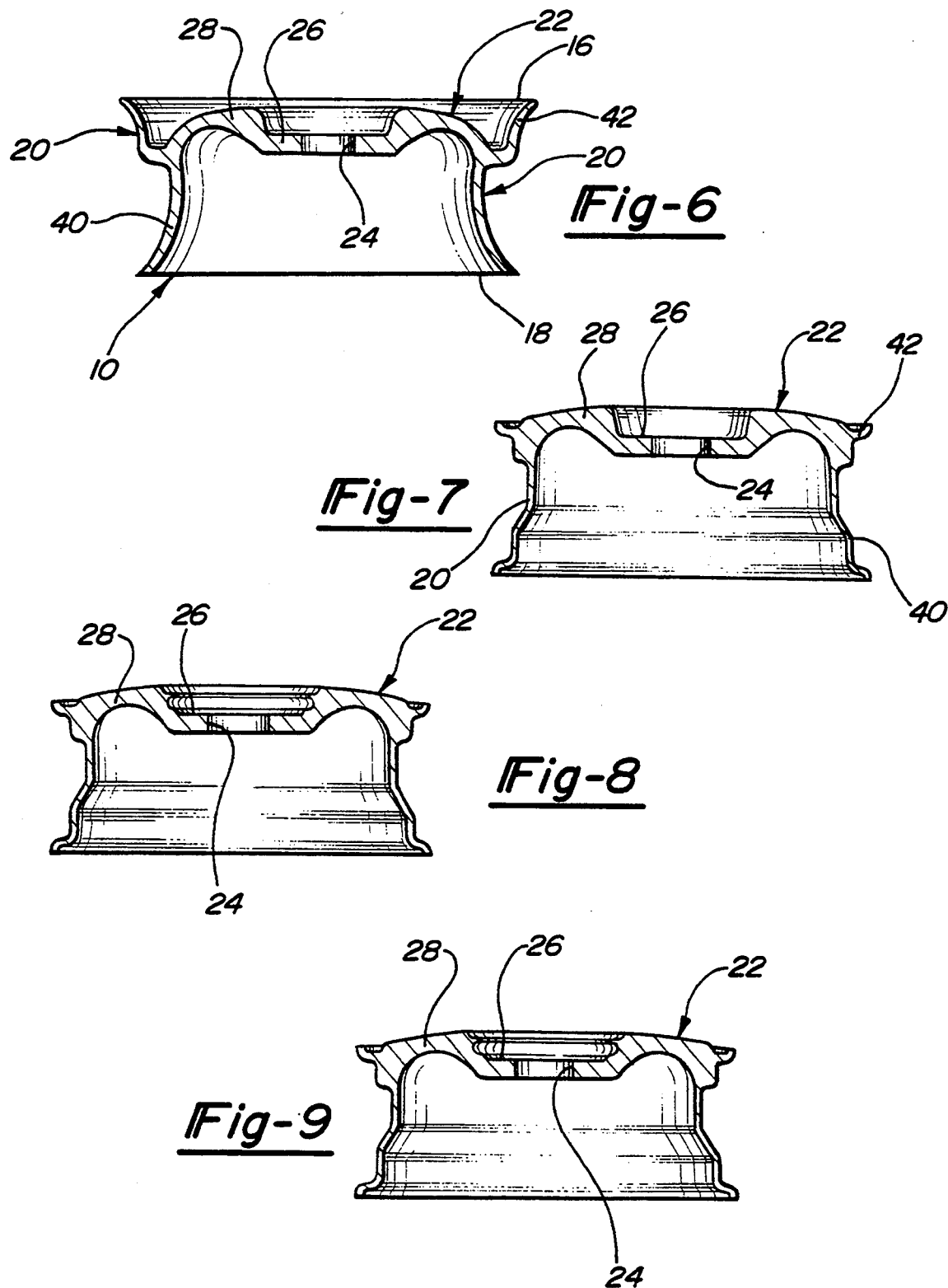

PROCESS OF MANUFACTURING ONE-PIECE FORGED WHEELS

BACKGROUND OF THE INVENTION

1. Field of the Invention

This invention relates to a process for manufacturing vehicle wheels and, in particular, to a process for manufacturing one-piece forged aluminum wheels for use in vehicles.

2. Description of the Prior Art

In the past, wheels for vehicles have been cast or forged of multiple pieces and then assembled to form the wheel. In the typical construction, the central disc or hub is formed independently of the rim which itself may be formed of one or more components. The components of the wheel are then assembled and welded together to form an integral assembly. The wheel typically comprises the central disc or hub having a plurality of vent openings and a plurality of lug openings to facilitate mounting of the wheel to the vehicle axle. Attached to the peripheral edge of the disc is the rim which retains the vehicle tire, particularly the sealing bead of the tire. The rim must be free of sharp edges to prevent damage to the tire and must be airtight to maintain tire pressure.

The prior known multiple piece wheels have several disadvantages including cost of manufacturing, quality concerns resulting from the mating engagement of the central disc with the rim, and deterioration of the weld joints particularly when plating of the assembled wheel is improperly conducted. The nature of the multiple component wheel, which requires multiple manufacturing stations, lends itself to quality problems and deterioration of the wheel assembly.

SUMMARY OF THE PRESENT INVENTION

The present invention overcomes the disadvantages of the prior known vehicle wheels by providing a method of manufacturing a one-piece forged wheel from a single piece of metal stock.

The manufacturing process begins with a ring-shaped blank cut from tube stock of aluminum or forged and machined into the donut shape desired. The rim section of the wheel is extruded coaxially from the ring while containing the inward radial flow along the hub section. By containing the radial inward flow during extrusion of the rim section, much smaller tonnage presses can be used since without such containment the material will flow across the hub face area and consume all of the force of a smaller press before the rim can extrude longitudinally to a sufficient length. Once the rim section is properly extruded, the containment tooling is no longer necessary and the hub design can be forged radially inwardly to its desired configuration.

As the hub is forged, alternating convex and concave areas are formed radially about the central hub opening. Subsequently, the concave areas are machined away from the interior side of the wheel to form the vent openings in the wheel. This leaves the convex areas as "spokes" of the wheel and avoids the use of piercing tools in the hub face. Alternatively, the vent openings or windows may be pierced into the wheel face using an appropriate tool.

With the hub section substantially formed, the forged wheel assembly will include inboard and outboard sections of the rim flared away from the axis of the wheel. The wheel is clamped in a rotary tool and the wheel is rotated about its axis. As the wheel spins, a roller is applied to the rim to form the rim configuration according to the configuration of the roller and the tool mold. In this manner, the rim contour is precisely formed without machining resulting in a thin, strong rim and a lightweight wheel. The extrusion, forging and rolling processes form a one-piece wheel with improved durability and reduced weight.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which:

FIGS. 1 through 12 show the process steps of forging a one-piece wheel embodying the present invention;

DETAILED DESCRIPTION OF A PREFERRED EMBODIMENT OF THE PRESENT INVENTION

Referring first to FIGS. 1 through 12, there are shown the different configurations of the one-piece forged wheel of the present invention as it is processed from a metal blank to the finished wheel. The manufacturing process of the present invention forms an integral wheel whereby welding of the hub to the rim is eliminated. Additionally, the wheel is manufactured such that smaller tonnage presses can be utilized to extrude and forge the wheel. The process precisely forms the contours of the wheel to create very thin yet strong rims resulting in a lightweight wheel with improved integrity.

Figure 1:
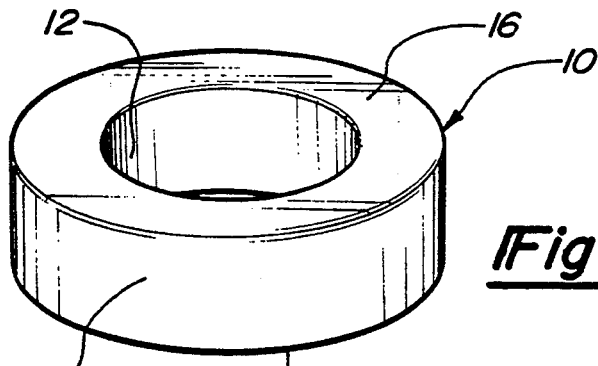
Figure 2:
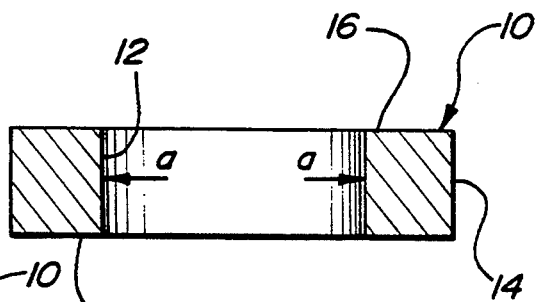
Figure 3:
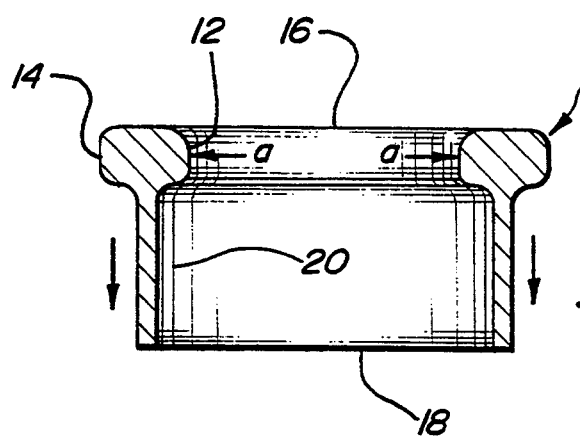
Figure 4:
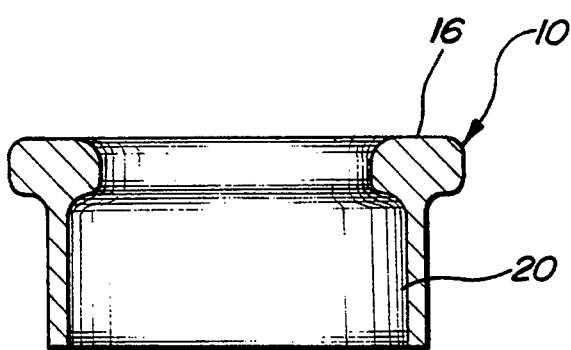

FIGS. 1 and 2 show an aluminum blank 10 in the form of a ring or donut from which the wheel is forged. The blank 10 is preferably cut to proper length from a tube of aluminum stock. As an alternative, the ring-shaped blank may be produced by a forging operation which flattens a section of solid aluminum bar and then piercing or boring the forged blank to remove the center of the ring. For reference purposes, the blank 10 has an inner surface 12, an outer radial surface 14, an outboard side 16, and an inboard side 18 all of which correspond to the reference position of the finished wheel. A rim section 20 is extruded coaxial to the axis of the ring 10 while containing the inward radial surface 12 along the hub area (arrows a). By containing the inward radial surface 12 a much smaller tonnage press can be utilized since the tonnage requirement is a factor of the cross-sectional area perpendicular to the press force. Without such containment, the material would tend to flow radially inwardly across the hub face and "consume" all of the force of a smaller press before the rim section 20 could be extruded to a sufficient length (FIG. 3). In a preferred embodiment, the rim section 20 is hot extruded to the desired length and then trimmed to the required length (FIG. 4).

Figure 5:
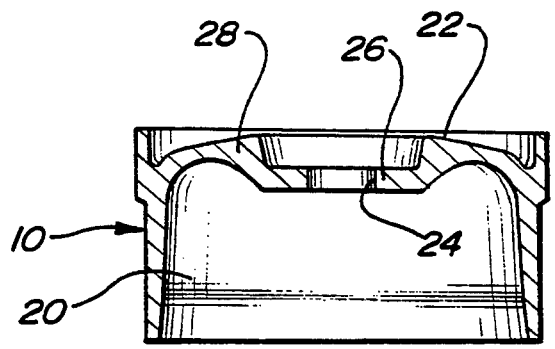
Figure 10:
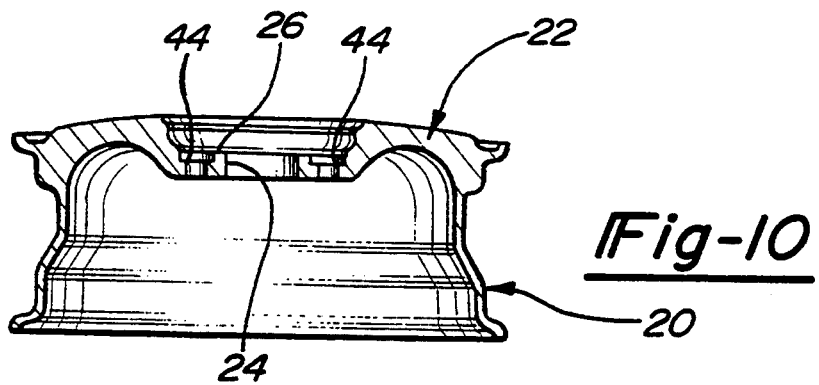
Figure 13:
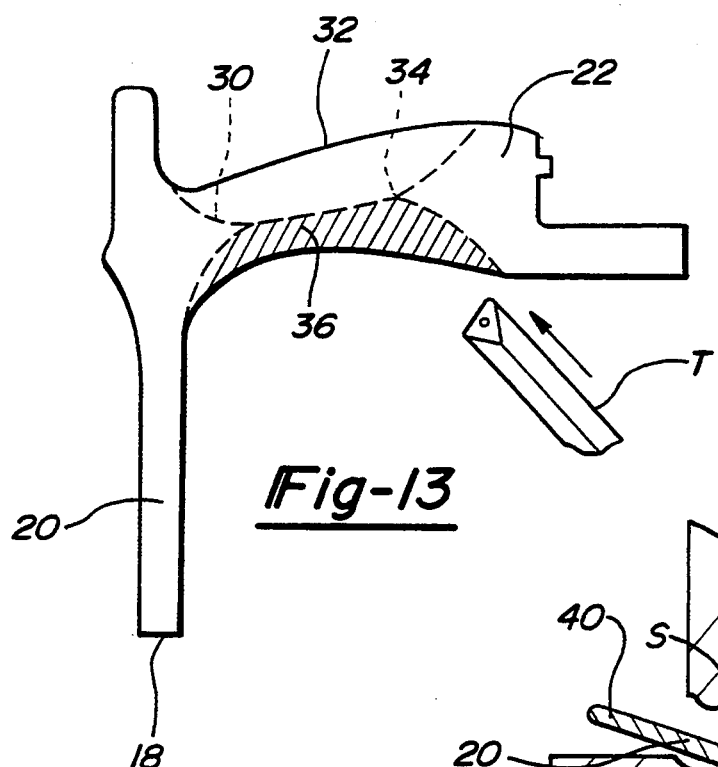
FIG. 13 is an enlarged cross-sectional perspective of the wheel hub showing the concave and concave areas of the hub machine to form vent openings in the hub.

After the rim section is properly extruded and trimmed, the containment tooling is no longer needed and may be removed from forging of the hub section 22 (FIG. 5). The hub section 22 is hot forged to the desired configuration in accordance with the configuration of the mold. Typically, the hub section 22 will include a hub opening 24 and a mounting face 26 surrounding the opening 24 to facilitate mounting of the wheel to the axle of the vehicle. Any ornamental configuration is forged in the peripheral area 28 between the rim section and the mounting face 26. In a preferred embodiment of the present invention, alternating concave 30 and convex 32 zones are forged radially about the hub face 22 as best shown in FIG. 13. In order to avoid the use of pierce tooling which may deform the hub face, the concave zones 30 are utilized to form vent openings or windows 34 in the hub section 22. The concave zones 30 are machined away from the inboard side 18 of the hub section 22 using an appropriate machining tool T until the appropriate opening 34 is formed at the bottom of the concave zone 20. The alternating openings 34 and convex zones 32 provide the appearance of spoke-like bodies in the hub 22 of the wheel. In an alternative embodiment, the wheel face may be formed with alternating sections of thick and thin material wherein the thin sections are pierced to form the windows creating vent openings in the wheel 10.

Figure 14:
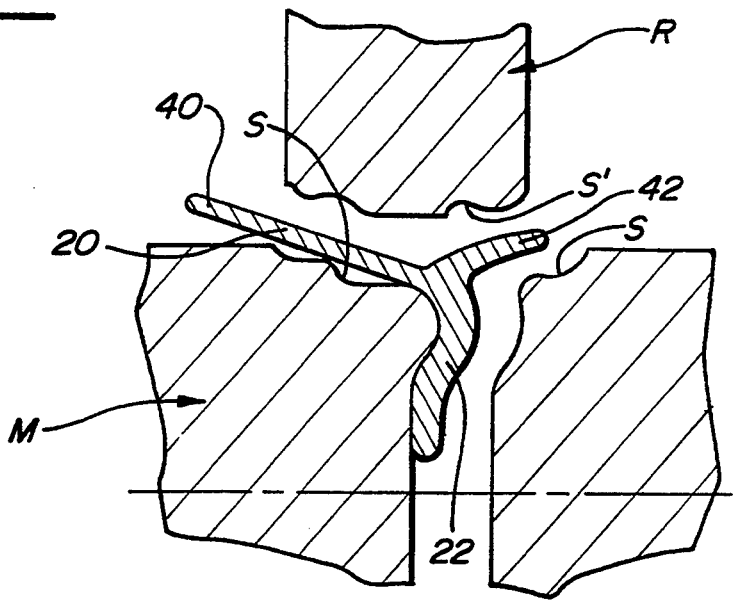
FIG. 14 is a cross-sectional view of the roller press in the open position with the wheel disposed therein.
Figure 15:
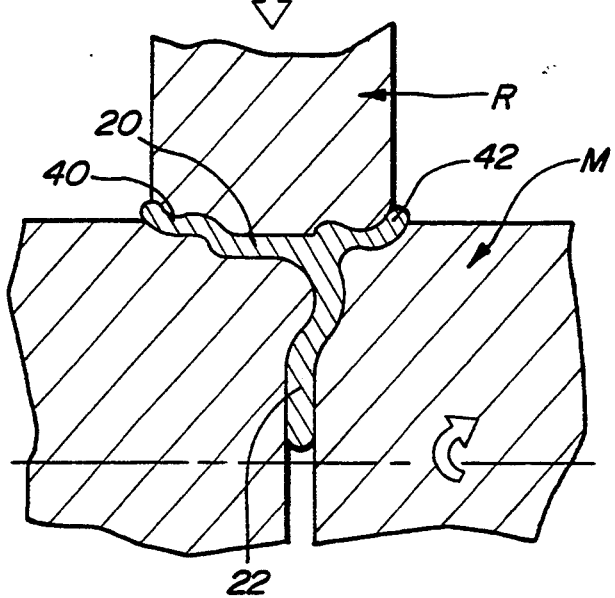
FIG. 15 is a cross-sectional view of the roller press with the wheel clamped therein for forming the rim configuration.

With the hub section 22 formed and machined, the inboard leg 40 and the outboard leg 42 of the rim section 20 are flared radially outwardly as shown in FIG. 6. The wheel 10 is then placed in the mandrel of a spinning machine M (FIGS. 14 and 15) and clamped into position by clamping against the hub section 22 of the wheel. The spinning machine M includes a molding surface S which incorporates the contour of the molded rim section. Similarly, a roller tool R has a mating molding surface S'. With the wheel clamped in the machine M, the wheel is spun about its axis and the roller tool R is applied to the rim section 20 to precisely form the rim contour. As a result, no machining is necessary except to trim the ends 40 and 42 and a very thin yet strong rim is produced using the extrusion and rolling processes as shown in FIG. 7. In applications where extremely close tolerances are required, the rim rolling operation may be conducted as a two-step process wherein a preliminary rolling operation is followed by a solution heat treatment operation and a final rolling operation. The final rolling operation removes the distortional effects of the solution heat treatment bath.

Figure 11:
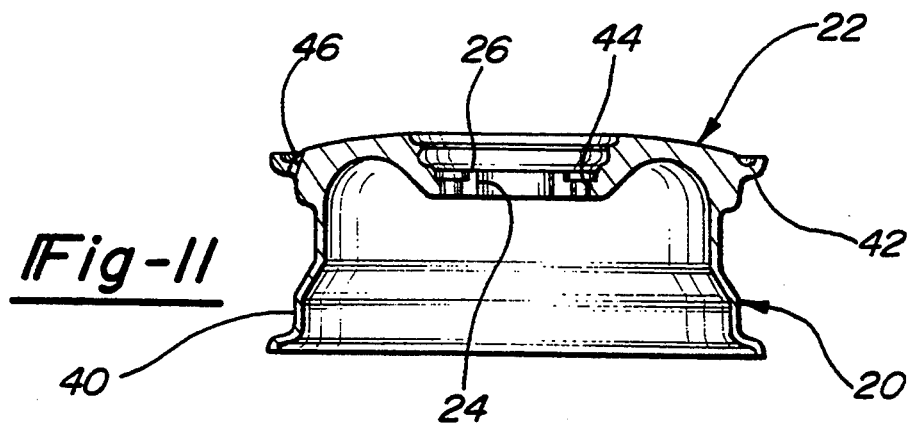
Figure 12:
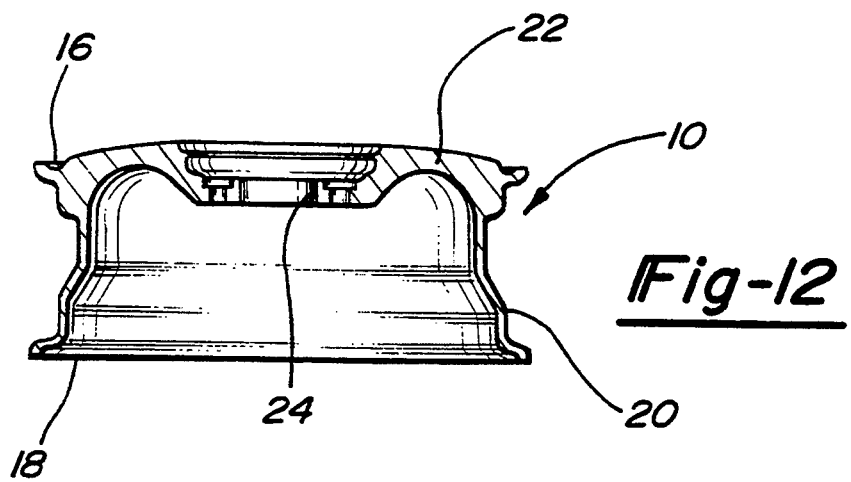

Once formed, final machining of the wheel is conducted. The outboard side of the hub face 26 is machined to the proper contour (FIG. 8) and the inboard side of the hub section 22 is machined as required (FIG. 9). Lug holes 44 are drilled in the hub face 26 (FIG. 10) and a valve hole 46 is drilled in through inboard leg 42 of the rim section 20 (FIG. 11). Finally, the wheel 10 is polished and a clear coat finish is applied forming the finished product as shown in FIG. 12. Thus, the process of the present invention produces a one-piece forged wheel 10 incorporating a thin yet strong rim resulting in a lightweight wheel. Welding of the hub to the rim is eliminated since both are integrally formed from a single piece of metal stock.

The foregoing detailed description has been given for clearness of understanding only and no unnecessary limitations should be understood therefrom as some modifications will be obvious to those skilled in the art without departing from the scope and spirit of the appended claims.

What is claimed is:

1. Process of manufacturing a one-piece wheel for a vehicle comprising:
    forming a ring of material adapted to comprise the one-piece wheel, said ring including an inner radial surface and an outer radial surface;
    extruding a rim section of said wheel coaxially to said ring while supporting said inner radial surface of said ring;
    removing said inner radial support of said ring and forging a hub section of said wheel; and
    forming the contour of said rim section.

2. The process as defined in claim 1 wherein said step of forging said hub section of said wheel forms alternating convex and concave zones radially spaced on said hub section.

3. The process as defined in claim 2 and comprising the further step of machining said concave zones of said hub section to form openings in said hub section.

4. The process as defined in claim 3 wherein said concave zones of said hub section are machined from an inboard side of said wheel to form said openings in said hub section.

5. The process as defined in claim 1 wherein said step of forming the contour of said rim section comprises the steps of:
    (a) mounting said wheel in a retaining mold with said rim section disposed outwardly; and
    (b) running a roller tool along said rim section whereby said rim section accepts the contour of said retaining mold and roller tool.

6. The process as defined in claim 5 wherein said retaining mold is rotated with said wheel therein such that said rim section passes between said roller tool and retaining mold to receive the contour thereof.

7. The process as defined in claim 1 wherein said ring is hot extruded to form said rim section coaxial to said ring.

8. The process as defined in claim 1 wherein said hub section is forged radially inward.

9. Process of manufacturing a one-piece wheel for a vehicle comprising:
    forming a ring of metal material, said ring including an inner radial surface and an outer radial surface;
    supporting said inner radial surface of said ring while extruding a rim section longitudinally coaxial to said ring, said inner radial support preventing radial inward flow of said metal material during extrusion of said rim section;
    removing said inner radial support of said ring and forging a hub section of said wheel, said hub section being forged radially inwardly and including a plurality of concave zones radially spaced on said hub section; and
    applying a roller tool to said rim section to form the contour of said rim section.

10. The process as defined in claim 9 wherein said concave zones of said hub section are machined from an inboard side of said wheel to form said openings in said hub section.

11. The process as defined in claim 10 wherein said step of forming the contour of said rim section includes the steps of:
    (a) mounting said wheel in a rotatable retaining mold with said rim section disposed radially outwardly in close proximity to an outer molding surface of said rotatable mold;

(b) applying a roller tool to said rim section, said roller tool having a mating configuration to said outer molding surface; and (c) rotating said retaining mold while applying pressure to said rim section through said roller tool whereby said rim section accepts the contour of said retaining mold and roller tool.

12. The process as defined in claim 9 and comprising the further step of drilling lug holes in said hub section following forging of said hub section.

13. The process as defined in claim 9 wherein said ring is made of an aluminum metal whereby said process forms a one-piece aluminum wheel.

* * * * *